United States Patent [19]

Yanagihara

[11] Patent Number: 5,845,042

[45] Date of Patent: Dec. 1, 1998

[54] TRANSMISSION RECORDING AND REPRODUCTION OF DIGITAL DATA AND TIME INFORMATION IN TRANSPORT PACKETS USING A COMPRESSION RATIO

[75] Inventor: Naofumi Yanagihara, Tokyo, Japan

[73] Assignee: Sony Corporation, Tokyo, Japan

[21] Appl. No.: 862,070

[22] Filed: May 22, 1997

Related U.S. Application Data

[62] Division of Ser. No. 555,872, Nov. 13, 1995.

[30] Foreign Application Priority Data

Nov. 14, 1994 [JP] Japan .................................. 6-304421
Jan. 27, 1995 [JP] Japan .................................. 7-031684

[51] Int. Cl.$^6$ .................................................. H04N 5/783
[52] U.S. Cl. ............................................. 386/81; 386/111
[58] Field of Search ........................ 386/6–8, 33, 68–82, 386/109, 111–112; H04N 5/92, 5/783

[56] References Cited

U.S. PATENT DOCUMENTS 5,587,806  12/1996  Yamada et al. ........................... 386/68
5,642,460   6/1997  Shimoda ................................... 386/68
5,673,358   9/1997  Boyce ....................................... 386/68
5,687,275  11/1997  Lane et al. ............................... 386/68

*Primary Examiner*—Thai Tran
*Attorney, Agent, or Firm*—Frommer Lawrence & Haug LLP; William S. Frommer

[57] ABSTRACT

A data packet which contains time information is time compressed and the time information is extracted from the time compressed data packet. A system clock is synchronized with the extracted time information and is multiplied by a predetermined compression ratio to produce replacement time information which replaces the time information in the time compressed data packet. The time compressed data packet that now contains the replacement time information is modulated and transmitted or recorded.

10 Claims, 16 Drawing Sheets

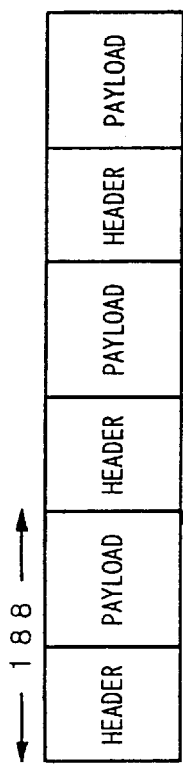
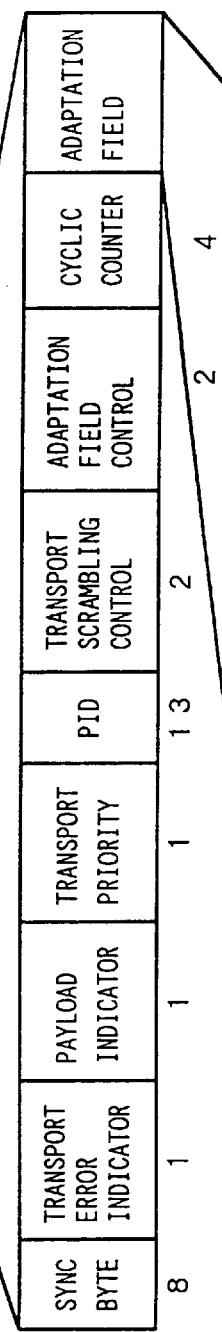
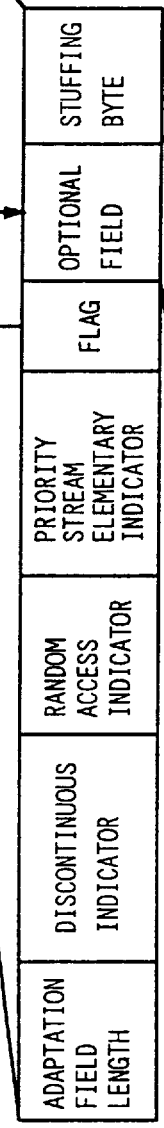
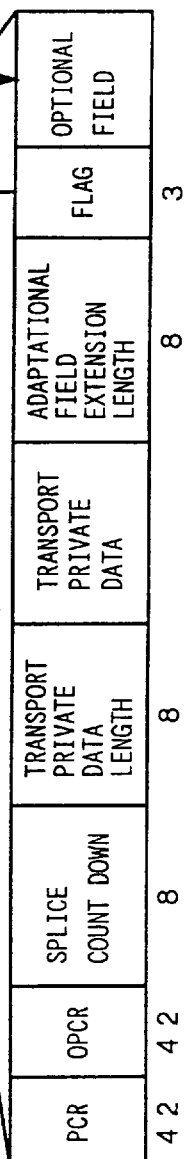
Fig. 1A
Fig. 1B
Fig. 1C
Fig. 1D

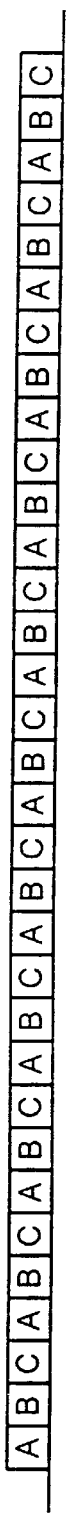
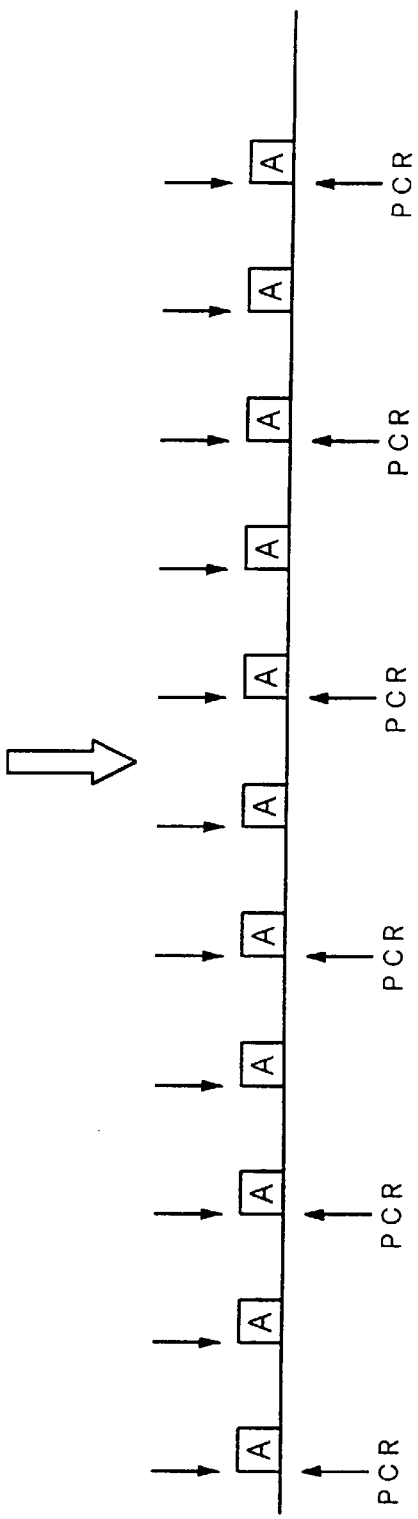
Fig. 3A
Fig. 3B
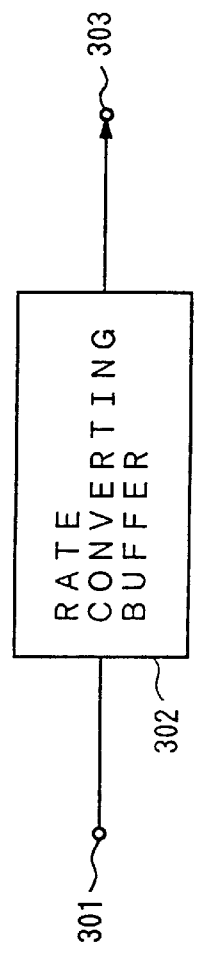
Fig. 4

HEAD A

Fig. 17
| | | TP1 (18x) | TP2 (4x) |
|---|---|---|---|
| 2*1HEAD/9000rpm | SPEED LOCK | ±1.5x, 2.5x, 3.5x, ···, 8.5x | NA |
| | PHASE LOCK | +18x/−16x | +4x/−2x |
| 1*2HEAD/9000rpm | SPEED LOCK | ±1.5x, 2.5x, 3.5x, ···, 8.5x | NA |
| | PHASE LOCK | +18x/−16x | +4x/−2x |
| 2*2HEAD/4500rpm | SPEED LOCK | ±1.5x, 2.5x, 3.5x, ···, 8.5x | NA |
| | PHASE LOCK | NA | +4x/−2x |
Fig. 19A
Fig. 19B

Fig. 20A

| | T0 | T1 | T2 | T3 |
|---|---|---|---|---|
| ECC3 (RESERVE) | 9SB | 9SB | 9SB | 9SB |
| NORMAL PLAY AREA | 101SB | 101SB | 101SB | 126SB |
| TRICK PLAY AREA — TP1 | 25SB | — | 25SB | — |
| TRICK PLAY AREA — TP2 | — | 25SB | — | — |

Fig. 20B

| | SBNo. FOR TP | | | | | | ECC3 | TRACK |
|---|---|---|---|---|---|---|---|---|
| TP1 (18×) | No.40-44 | No.62-66 | No.84-88 | No.106-110 | No.128-132 | | No.147-155 | T0 |
| TP2 (5×) | | No.38-62 | | | | | | T1 |
| TP1 (18×) | No.40-44 | No.62-66 | No.84-88 | No.106-110 | No.128-132 | | No.147-155 | T2 |
| TP2 (5×) | | | | — | | | No.147-155 | T3 |

TRANSMISSION RECORDING AND REPRODUCTION OF DIGITAL DATA AND TIME INFORMATION IN TRANSPORT PACKETS USING A COMPRESSION RATIO

This application is a division of application Ser. No. 08/555,872, filed Nov. 13, 1995.

BACKGROUND OF THE INVENTION

The present invention relates to a transmitting apparatus and to a digital video tape recorder and, more particularly, to apparatus and method for recording and reproducing MPEG2 transport packets to and from a magnetic tape.

As is known, digital video tape recorders compress a digital video signal using discrete cosine transformation (DCT) and variable length encoding prior to recording the digital video signal on a magnetic tape. NTSC video signals generally are recorded in a standard (SD) mode and high definition television (HDTV) signals generally are recorded in a high definition (HD) mode. Typical recording rates in the SD and HD modes are 25 Mbps (megabits per second) and 50 Mbps, respectively.

Currently, a format known as MPEG2 (Moving Pictures Expert Group) for video signals has been developed. In MPEG2 systems, plural programs generally are time division multiplexed prior to being transmitted, and time information, which is included in those video signals, identify the real time transmissions of each of the programs. MPEG2 transmissions are time compressed and thus transmitted in a shorter time than the real "play" time of each of the programs contained therein.

As previously stated, digital video signals are recorded in an SD mode at the rate of 25 Mbps. At this recording rate, 5 of the 25 Mbps are utilized for "trick-play" data which is stored in a trick-play area of a track and which is reproduced in a high speed reproducing mode, and 20 of the 25 Mbps are utilized for "normal" data that is reproduced in a standard speed reproducing mode. Furthermore, if one of the programs in the MPEG2 signal has a data rate of, for example, 5 Mbps and the length of that program is, for example, two hours, then the two-hour program can be transmitted in only one half of an hour (i.e., 30 minutes) if the data rate of the program is converted to 20 Mbps.

Digital video tape recorders currently can record up to 4½ M hours' worth of programs on a standard cassette in the SD mode. If each program to be recorded is time compressed in the manner described above, and assuming the data rate and length of each program is 5 Mbps and two hours, respectively, then nine two-hour programs can be recorded on a standard cassette.

An MPEG2 signal includes a plurality of programs which have been encoded and time divisionally multiplexed and which are transmitted in data units called transport packets. Timing data (DTS), which is used to extract reproduced data from a buffer, and other timing data (PTS), which is necessary for displaying the video image, are included in a header of each of the transport packets (PES). PTS/DTS data also are included with audio data.

A 27 MHz system clock is used to encode an MPEG2 video signal and the values of the PTS/DTS data are derived from the system clock. When a transmitted MPEG2 signal is decoded, the decoder's system clock is synchronized to the transmitted MPEG2 signal using time data (i.e., PCR data) that represents the value of the system clock during encoding of the video signal and which is included in each of the transport packets of the MPEG2 signal. PCR data is added to each transport packet of each program in the signal.

FIG. 1 illustrates the data structure of a transport packet in an MPEG2 signal. Each transport packet has a fixed data length of 188 bytes and includes a header, further described below, and a payload which includes the encoded video and audio data. The header of a transport packet includes data that identifies the contents of the transport packet, for example, the particular program to which the transport packet pertains.

FIG. 1A illustrates three successive transport packets, each of which includes a header and a payload. The header, as shown in FIG. 1B, includes 8 sync bytes, a 1-byte transport error indicator which indicates whether the transport packet contains errors, a payload indicator byte which identifies the beginning of the payload section, a transport priority byte which identifies the assigned priority of the transport packet, 13 bytes of packet identification data (PID) which identifies various attributes of each data stream of the transport packet, 2 bytes of transport scrambling control data which identify whether the payload data is scrambled and the type of scrambling used, 2 bytes of adaptation field control data which indicates whether an adaptation field is present, a cyclic (or continuity) counter which indicates whether the transport packet is complete or is only partially generated, and adaptation field data, which is illustrated in FIG. 1C.

As shown in FIG. 1C, the adaptation field includes 8 bytes of adaptation field length data which indicates the length of this field, a discontinuity indicator which indicates whether the system clock has been reset and whether the header contents are new, random access indicator data which indicates the random access entry point, a priority stream elementary indicator which indicates whether the payload includes an important high-priority section, an optional field flag, an optional field which is illustrated in FIG. 1D, and 1 byte of stuffing data.

The optional field is shown in FIG. 1D and includes PCR data (previously discussed), OPCR data, splice countdown data, a transport private data length, transport private data, an adaptation field extension length, and an optional field which is identified by the 3-byte flag. As is known, PCR data is a time stamp which synchronizes a system clock in an MPEG2 decoding system.

FIG. 2 is a block diagram of an exemplary MPEG2 system which time divisionally multiplexes plural television programs and which transmits and records those television programs on a magnetic tape. Three digitally-compressed programs P11, P12 and P13 are supplied to input terminals 201A, 201B, and 201C, respectively. The three programs can have different data rates, for example, program P11 can have a data rate of 5 Mbps, program P12 can have a data rate of 4 Mbps, and program P13 can have a data rate of 3 Mbps. Prior to being supplied to terminals 201A, 201B and 201C, programs P11, P12 and P13 each are divided into 188-byte transport packets which include PCR time data indicative of when each transport packet is formed. Programs P11, P12 and P13 each are supplied to PCR capture circuits 202A, 202B and 202C, respectively, which detect the respective PCR values contained therein. Programs P11, P12 and P13 then are supplied at predetermined bit rates to FIFO circuits 203A, 203B and 203C, respectively, which transmit the programs to a multiplexer 205 which time divisionally multiplexes the programs and supplies the time divisionally multiplexed signal at a data rate of 30 Mbps to a PCRI restamping circuit 209.

Multiplexer 205 further time divisionally multiplexes "stuffing" bits which have been supplied to input terminal 206 so that the data rate of the time divisionally multiplexed programs is matched to the 30 Mbps data output rate. However, upon stuffing (i.e., inserting) of "stuffing" bits to the multiplexed three programs, time data included in the transport packets are "shifted" which causes a "jitter" of the PCR data.

A captured PCR value is supplied to a PLL circuit 204 which includes a PCR recovery circuit 207 which compares the captured PCR value and a counter value which is used to synchronize the system clock, and a counter circuit 208 which generates the 27 MHz system clock. PLL circuit 204 supplies the system clock to PCRI restamping circuit 209 which replaces the PCR value contained in the multiplexed signal (from multiplexer 205) with the value supplied from circuit 204. The output of PCRI restamping circuit 209 is supplied to a channel coder/modulator circuit 210 which modulates the multiplexed signal using a transfer clock signal TCK supplied thereto and transmits the modulated signal.

The transmitted signal is received by a front-end circuit 221 of a transmission receiving circuit (which may be part of a digital video tape recorder). Front-end circuit 221 supplies the transmitted signal to a demultiplexer/descrambler circuit 222 which demultiplexes and descrambles (if necessary) one of the programs contained in the time divisionally multiplexed transmitted signal. The demultiplexed signal is supplied to a decoder 224 and to a PCR capture circuit 231 of a digital video tape recorder. Front-end circuit 221 also supplies the transmitted signal to a transfer clock recovery circuit 223 which recovers the transfer clock signal TCK therefrom. Signal TCK is supplied to demultiplexer circuit 222 and to a buffer memory 236, to be described.

The demultiplexed signal (shown as transfer stream TS) is supplied to PCR capture circuit 231 which extracts the PCR value from the header of the transport packet and supplies the PCR value to a PLL circuit 232 which compares the system clock value (of the digital video tape recorder) with the extracted PCR value in order to synchronize the 27 MHz system clock. PLL circuit 232 includes a PCR recovery circuit 233 which compares the extracted PCR value and the system clock and a counter circuit 234 which supplies a count value synchronized with the system clock to an ATS inserting circuit 235.

PCR capture circuit 231 supplies the demultiplexed signal to ATS inserting circuit 235 which inserts the output of the counter 234 into the demultiplexed signal. As is known, the inserted time data allows a reproducing device to reconstruct the burst shape upon recording. The demultiplexed signal is supplied to buffer memory 236 which at the transfer clock rate TCK supplied thereto buffers the signal for subsequent recording.

The MPEG2 video signal is reproduced from a magnetic tape in a reproducing digital video tape recorder and the reproduced signal is supplied to a buffer memory 241 and to an ATS capture circuit 242. ATS capture circuit 242 extracts the ATS data value from the reproduced signal and supplies the ATS value to a memory controller 243. Buffer memory 241 receives a control signal from memory controller 243 and a transfer clock signal TCK which control the writing and the reading of the reproduced video signal to and from buffer memory 241. A system clock generator 250 generates the 27 MHz system clock from the ATS value extracted and a rotating drum (not shown) of the digital video tape recorder is rotated in synchronization with the system clock.

Referring now to FIGS. 3A and 3B, a schematic diagram illustrating the demultiplexing of a selected program A from a time divisionally multiplexed signal containing programs A, B and C is shown. As previously indicated, the data rate of the time divisionally multiplexed signal is 30 Mbps, and the data rate of a selected program A is equal to, for example, 10 Mbps. A rate converting buffer 302, shown in FIG. 4, converts the data rate of the demultiplexed signal (which now contains only program A) supplied to an input terminal 301 by one-third from 30 Mbps to 10 Mbps. The rate converted signal is supplied at terminal 303 and subsequently recorded on a magnetic tape.

One problem encountered in the above-described system is that time data changes when the data rate of a transport packet changes. This change causes the PCR value in each time-compressed transport packet to represent incorrect time information, and thus, results in the inability to properly reproduce the recorded MPEG2 signal.

Another difficulty encountered in the above-described system is the general inability to ensure that no errors occur in the PCR value and that the PCR value is properly and accurately maintained throughout the entire transmitting, recording and reproducing system.

Furthermore, MPEG2 formatted video data includes I-frames which are intraframe-encoded, P-frames which are forward-prediction encoded, and B-frames which are bidirectionally-prediction encoded. During variable or high-speed reproduction of MPEG2 video data, P- and B-frames cannot be properly decoded since only part of each frame is reproduced. And although reproduced I-frames can be decoded without P- and B-frame data in high-speed reproducing modes, I-frames still cannot properly be encoded because their positions on the recorded tracks are unknown due to the fact that considerable header information are not reproduced in such high-speed reproducing modes.

OBJECTS OF THE INVENTION

Therefore, it is an object of the present invention to provide apparatus and method for transmitting video data and apparatus and method for recording and reproducing digital video data to and from a record medium which overcome the shortcomings of the above-described system.

Another object of the present invention is to provide apparatus and method which reliably transmits, records and reproduces the PCR value in a transport packet of an MPEG2-formatted video signal.

A further object of the present invention is to provide apparatus and method for recording and reproducing digital video data in which a time base is correctly maintained when transport packets are rate-converted.

An additional object of this invention is to provide a recording and reproducing technique in which picture quality is maintained in variable or high-speed reproducing modes when transport packets are rate-converted.

Various other objects, advantages and features of the present invention will become readily apparent to those of ordinary skill in the art, and the novel features will be particularly pointed out in the appended claims.

SUMMARY OF THE INVENTION

In accordance with one embodiment of the present invention, apparatus and method operate to time compress a data packet which contains a first time information, extract the first time information from the time compressed data packet, generate a system clock which is synchronized with the extracted first time information, generate a second time information by multiplying the system clock by a predetermined compression ratio, replace the first time information in the time compressed data packet with the second time information, and modulate and transmit the time compressed data packet that contains the second time information.

In accordance with another embodiment of the present invention, apparatus and method operate to receive a time compressed data packet which contains time information that had been compressed by a predetermined compression ratio, extract the compressed time information from the data packet, generate a system clock which is synchronized with the extracted compressed time information, generate second time information by multiplying the system clock by the predetermined compression ratio, insert the second time information into the time compressed data packet, and record on a record medium the time compressed data packet that contains the second time information.

In accordance with a further embodiment of the present invention, apparatus and method operate to reproduce a data packet which was time compressed at a predetermined compression ratio and which contains time information adapted for reading out the data packet at a speed that is dependent upon the compression ratio, buffer the reproduced data packet, recover the time information from the reproduced data packet, and control the buffering of the reproduced data packet in accordance with the recovered time information.

In accordance with yet another embodiment of the present invention, apparatus and method operate to generate a system clock, receive a data packet at a first transmission rate, determine a reception time of the data packet as indicated by the system clock, add time data identifying the reception time to the data packet, convert the transmission rate of the data packet which has the time data added thereto from the first transmission rate to a second transmission rate, and record at the second transmission rate the data packet including the time data on a record medium.

In accordance with yet a further embodiment of the present invention, apparatus and method operate to generate a reference clock, reproduce in accordance with the reference clock a data packet which was rate converted from an original transmission rate and which contains time data corresponding to the original reception time of the data packet, convert the rate of the reproduced data packet to the original transmission rate, detect the time data in the reproduced data packet, and synchronize the reference clock with the detected time data.

In accordance with still yet another embodiment of the present invention, apparatus and method operate to receive a data packet, provide a portion of the data packet (e.g., intraframe coded data) as variable-speed data, and record the data packet and the variable-speed data in a normal and a trick-play area, respectively, of successive tracks on a record medium. The trick-play area is located on each track at a position which corresponds to an area of a track which is reproducible in a fast-speed reproducing mode.

As an aspect of this invention, the respective trick-play areas of alternating tracks constitute first trick-play areas and the respective trick-play areas of the other alternating tracks constitute second trick-play areas, and the variable speed data is recorded in the first and second trick-play areas. The first trick-play areas are located on the alternating tracks at a position which corresponds to an area of a track which is reproducible in a first fast-speed reproducing mode, and the second trick-play areas are located on the other alternating tracks at a position which corresponds to an area of a track which is reproducible in a second fast-speed reproducing mode different from the first fast-speed reproducing mode.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIGS. 1A–1D illustrate the data structure of a transport packet of an MPEG2 signal;

FIGS. 3A and 3B are schematic diagrams illustrating the demultiplexing of a selected program A from a time divisionally multiplexed signal containing programs A, B and C;

FIG. 4 is a block diagram of a rate converting buffer used in the circuit shown in FIG. 2;

FIG. 17 is a chart of possible tape reproducing speeds of a digital video tape recorder embodying the present invention;

FIGS. 19A and 19B are helpful in understanding how a head A reproduces the outer and middle trick-play areas in two scans in accordance with the present invention;

FIGS. 20A and 20B illustrate the sync block data structure of each of four adjacent tracks T0, T1, T2 and T3;

DETAILED DESCRIPTION OF CERTAIN PREFERRED EMBODIMENTS

Figure 5:
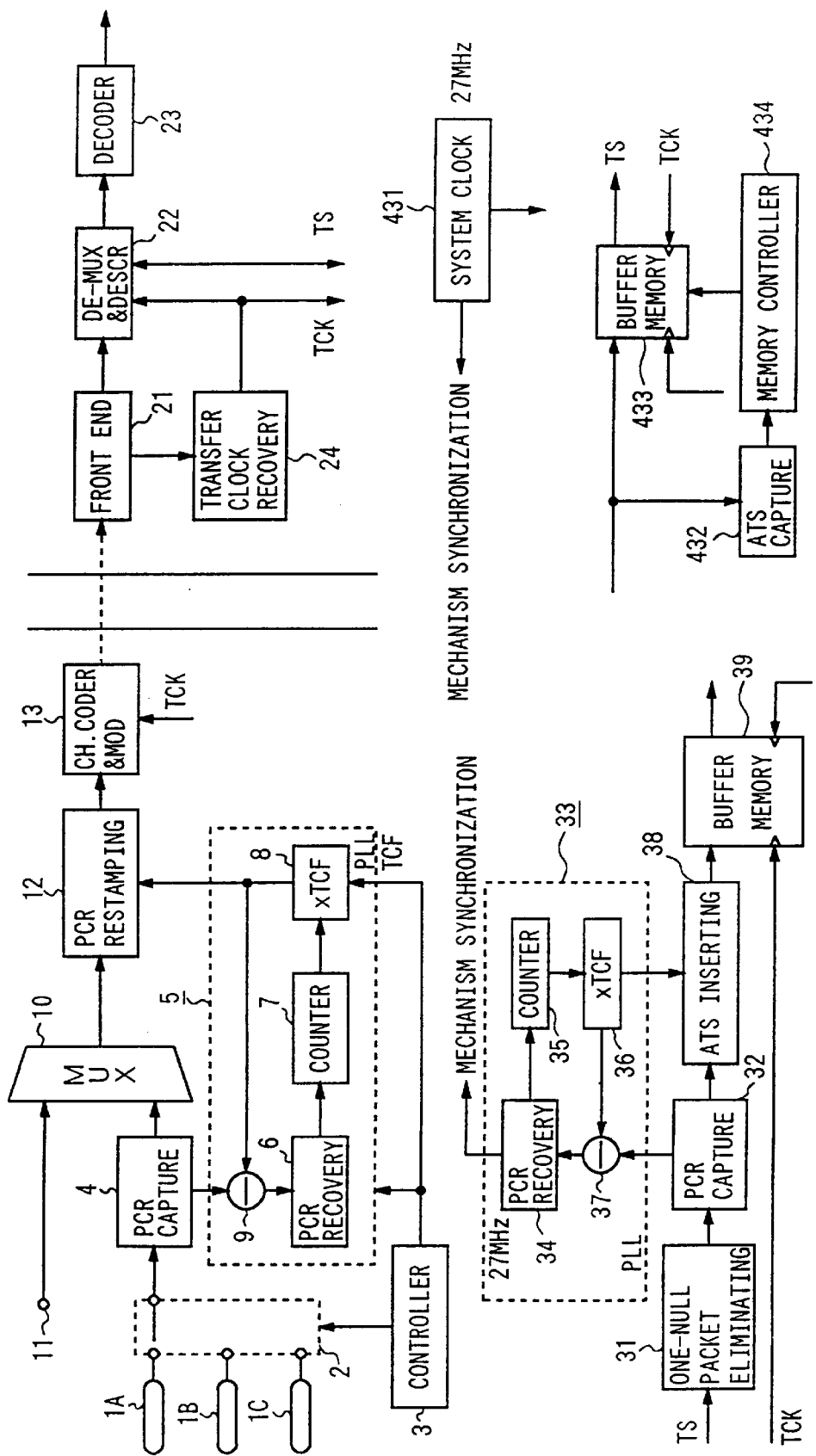
FIG. 5 is a block diagram of apparatus for transmitting, recording and reproducing digital video data in accordance with the present invention.
Figure 6:
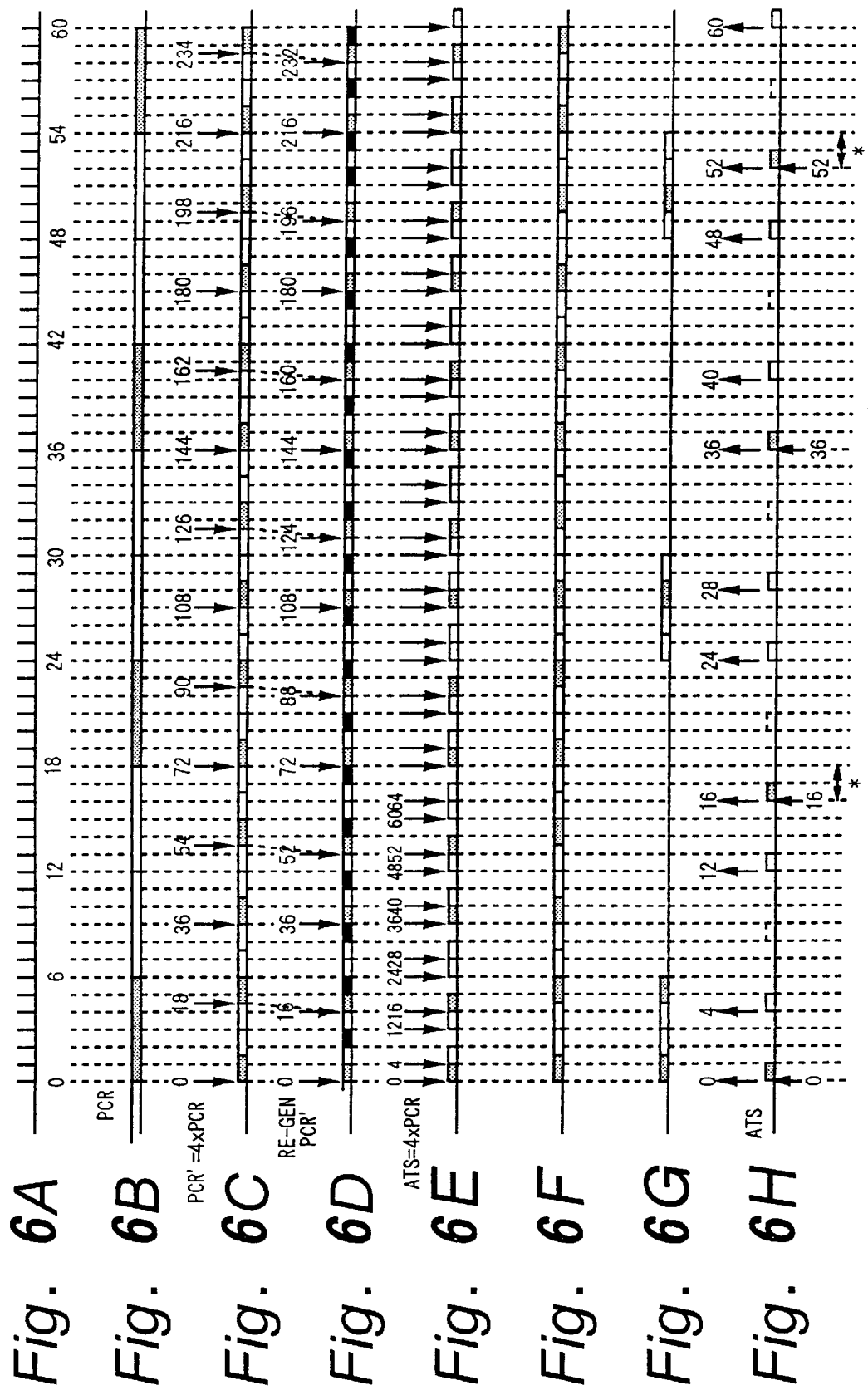
FIGS. 6A to 6H are time diagrams illustrating time compression and time signal generation performed by the circuit of FIG. 5 in accordance with the present invention.

Referring now to FIG. 5 of the drawings, apparatus for transmitting digital video data, and for recording and reproducing digital video data to and from a magnetic tape in accordance with the present invention is shown. Like the apparatus shown in FIG. 2, programs P-1, P-2 and P-3, which have data rates of 5 Mbps, 4 Mbps and 3 Mbps, respectively, are digitally compressed and supplied to input terminals 1A, 1B and 1C, respectively. As is appreciated, these programs previously are divided into transport packets, each consisting of 188 bytes of data, are transmitted in a burst manner, and include PCR values which represent the time when each of the packets is formed. Programs P-1, P-2 and P-3 are supplied to a program selecting and time compressing circuit 2 which, in response to a control signal supplied from a controller 3, selects and time compresses one of the programs. For example, circuit 2 selects program P-1 which has a bit rate of 5 Mbps and which is illustrated as the shaded portion of the timeline shown in FIG. 6B, and wherein FIG. 6A represents the relative time of the 27 MHz system clock. Circuit 2 converts the bit rate of program P-1 from 5 Mbps to 20 Mbps; thus, since the bit rate of program P-1 is increased by a factor of 4, the amount of time required to transmit program P-1 is reduced from, for example, two hours to one-half of an hour (i.e., 30 minutes). Circuit 2 supplies the time compressed program to a PCR capture circuit 4 which detects the PCR value therein and supplies the detected PCR value to a PLL circuit 5.

Since the selected program P-1 is time compressed by a compression ratio of, for example, 4, the rate at which the PCR value changes is 4 times (i.e., the compression ratio) greater than the rate change of the PCR value in the uncompressed signal. PLL circuit 5 compares in a subtracter circuit 9 the captured PCR value supplied from circuit 4 and a counter value which is multiplied by the compression ratio. That is, a counter 7 supplies a counter value to a multiplying circuit 8 and controller 3 supplies the amount of compression, that is, the compression ratio (e.g., 4) also to multiplying circuit 8 and circuit 8 supplies the product of the counter value and the compression ratio to subtracter circuit 9. Circuit 9 supplies the compared result to a PCR recovery circuit 6 which controls counter 7 so that the output of counter 7 is synchronized with the captured PCR value, thus producing a 27 MHz system clock.

PCR capture circuit 4 supplies the time compressed selected program to a multiplexer 10 which adds to the time compressed signal stuffing bits that have been supplied to a terminal 11 so that the data rate of the signal equals 30 Mbps. For the example stated above, where the data rate of the time compressed signal is 20 Mbps, stuffing bits which have a data rate of 10 Mbps are added to the signal to produce the 30 Mbps video signal.

Multiplexer 10 supplies the multiplexed signal at a bit rate of 30 Mbps to a PCR restamping circuit 12. PLL circuit 5 supplies the output of circuit 8, identified herein as data PCR' (see FIG. 6C), also to PCR restamping circuit 12 which replaces in the multiplexed signal the PCR data with the PCR' data. PCR restamping circuit 12 supplies the video signal (with the PCR' data) to channel coder/modulator circuit 13 which encodes and modulates the video signal utilizing a transfer clock signal TCK and the modulated signal is transmitted.

Figure 2:
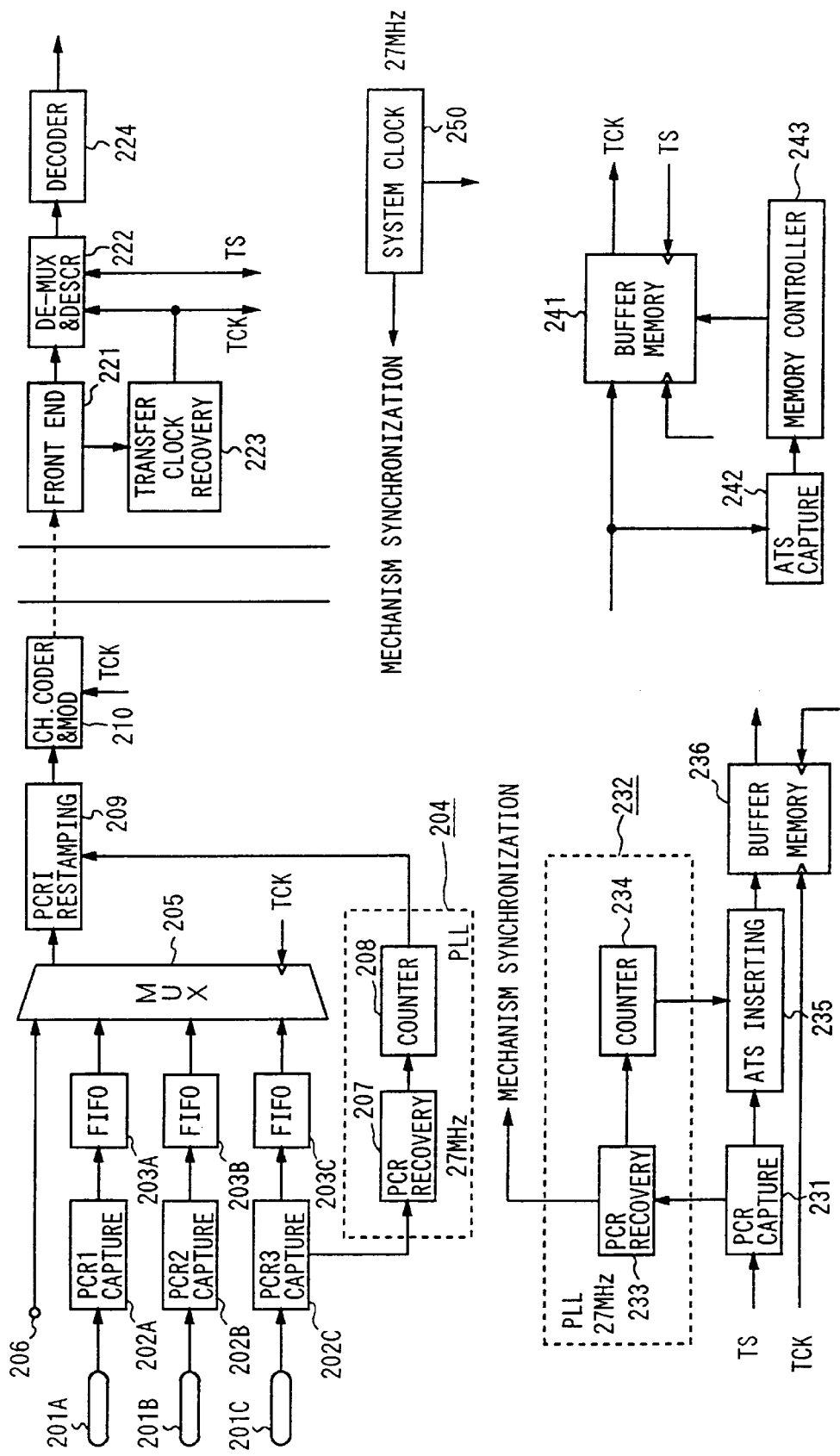
FIG. 2 is a block diagram of an MPEG2 system which time divisionally multiplexes plural television programs and which transmits and records those television programs on a magnetic tape.

A receiver which includes a front end circuit 21, a demultiplexer and descrambler circuit 22, a decoder circuit 23 and a transfer clock recovery circuit 24, receives the transmitted signal and operates in a manner similar to the receiver shown in FIG. 2 of the drawings (circuits 221–224). However, and in accordance with the present invention, the data stream TS, that is, the demultiplexed and descrambled signal, is supplied to a packet eliminating circuit 31 in a digital video tape recorder embodying the present invention. Circuit 31 effectively removes the stuffing bits that had been multiplexed with the video signal in multiplexer 10 and supplies the resultant video signal to a PCR capture circuit 32. PCR capture circuit 32 detects the value of the PCR data contained in the video signal (here, the value detected is PCR') and supplies the PCR' value to a PLL circuit 33. PLL circuit 33 includes a PCR recovery circuit 34, a counter 35, a multiplying circuit 36 and a comparing circuit 37. PLL circuit 33 compares the PCR' value of the transmitted video signal and the output of counter 35 multiplied by the compression ratio (e.g., 4) and the compared result is fed back to PCR recovery circuit 34 which generates the digital video tape recorder's 27 MHz system clock. A drum (not shown) of the digital video tape recorder rotates in synchronization with the system clock. PCR recovery circuit 34 controls counter 35 so that the counter is synchronized with the PCR' value in the video signal and the output of counter 35 multiplied by the compression ratio (in multiplying circuit 36) is supplied to an ATS inserting circuit 38. PCR capture circuit 32 supplies the transmitted video signal to ATS inserting circuit 38 which inserts therein the output of circuit 36 (i.e., four times the PCR' value) as the ATS time information data. FIG. 6D illustrates the regenerated PCR' value (the ATS data) and FIG. 6E represents the timing of the ATS data inserted in the video signal in circuit 38 upon outputting of the video signal from a buffer memory 39. ATS inserting circuit 38 supplies the video signal (with the inserted ATS data) to buffer memory 39 which stores the video signal in response to transfer clock signal TCK supplied thereto. The video signal is outputted from buffer memory 39 and recorded on a magnetic tape in the SD mode of the digital video tape recorder.

FIG. 6F represents the timing of the video signal reproduced from the magnetic tape with such reproduction being accomplished in a slow reproduction mode. The reproduced signal is supplied to an ATS capture circuit 432 and to a buffer memory 433. ATS capture circuit 432 extracts from the video signal the ATS data and supplies the extracted data to a memory controller 434 which controls the buffering of the reproduced video signal in buffer memory 433. Transfer clock signal TCK also is supplied to buffer memory 433 to control the buffering thereof and a system clock generator 431 generates the 27 MHz system clock which, inter alia, controls the rotation of the drum (not shown).

During reproduction, the video signal is reproduced at a slow reproduction rate equal to the compression ratio, that is, a one-quarter slow speed reproduction rate. FIGS. 6G and 6H illustrate the synchronization of the ATS value and the PCR value during reproduction of the video signal at the slow reproduction rate.

Figure 7:
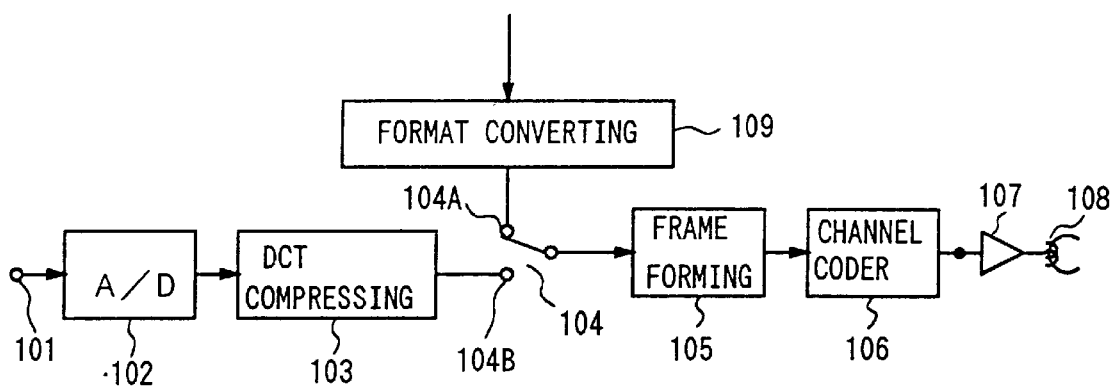
FIG. 7 is a block diagram of a digital video tape recorder which records digital video data on a magnetic tape in accordance with one embodiment of the present invention.

FIG. 7 is a block diagram of a digital video tape recorder which records digital video data in accordance with the present invention. The digital video tape recorder includes an analog-to-digital (A/D) converter 102, a discrete cosine transformation (DCT) compressing circuit 103, a switch 104, a frame forming circuit 105, a channel coder 106, a recording amplifier 107, a recording head 108 and a format converting circuit 109. When recording NTSC television signals, or other similar television signals, those television signals are supplied to an input terminal 101 and to A/D converter 102 which converts the television signal to a digital video signal. DCT compressing circuit 103 discrete cosine transforms, variable length encodes and quantizes the digital data to produce compressed digital data. DCT transformation, variable length encoding and quantization are well known in the art, and therefore, for purposes of brevity, the description of such processes is omitted herein.

Switch 104 operates to provide the digital signal supplied at terminal 104B to frame forming circuit 105 when the video signal is supplied to input terminal 101, and operates to supply the digital signal supplied at terminal 104A to frame forming circuit 105 when transport packets, e.g., MPEG2-formatted digital data, is supplied to format converting circuit 109.

DCT compressing circuit 103 supplies the compressed digital signal to terminal 104B of switch 104 which supplies the compressed digital signal to channel coder 106 via frame forming circuit 105. Circuit 105 formats the data into frames and performs error correction coding. The framed digital signal is supplied to channel coder 106 which modulates the digital signal before the digital signal is recorded by recording head 108 on a magnetic tape.

When MPEG2 formatted video data is supplied to the digital video tape recorder shown in FIG. 7, a transport packet of the MPEG2 signal is supplied to format converting circuit 109 which converts the bit rate of the transport packet and processes the transport packet in the manner described above with reference to FIG. 5. In other words, format convert circuit 109 is comprised of circuits 31, 32, 33, 38 and 39 of FIG. 5. Upon such rate converting and formatting, the processed transport packet is supplied via switch 104 to frame forming circuit 105. Like standard television signals, the processed transport packet is framed and channel-encoded in frame forming circuit 105 and channel coder 106, respectively, prior to being recorded on a magnetic tape.

Figure 8:
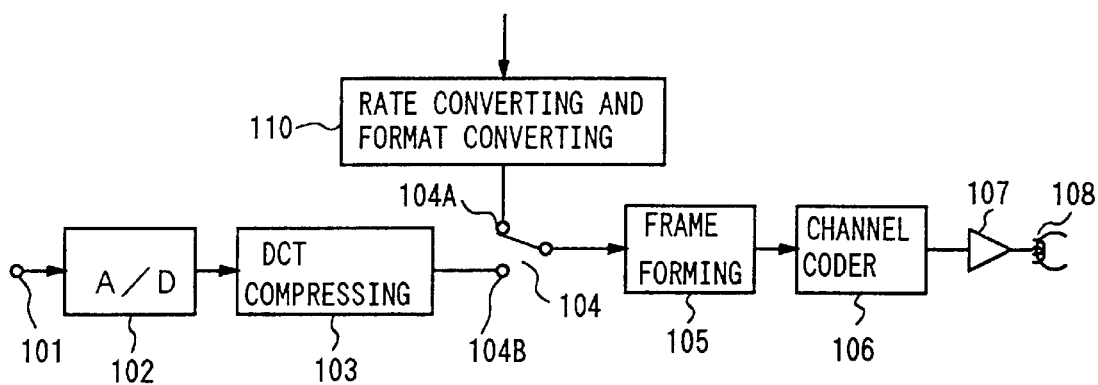
FIG. 8 is a block diagram of a digital video tape recorder which records digital video data in accordance with another embodiment of the present invention.

FIG. 8 illustrates a digital video tape recorder in accordance with another embodiment of the present invention. As shown, the digital video tape recorder includes an A/D converter 102, a DCT compressing circuit 103, a switch 104, a frame circuit 105, a channel coder 106, a buffer 107, and a recording head 108, all of which operate in the same manner as described in the digital video tape recorder shown in FIG. 7. However, rate converting and format converting circuit 110 operates in a manner different from that of format converting circuit 109, as further discussed below.

Figure 9A:
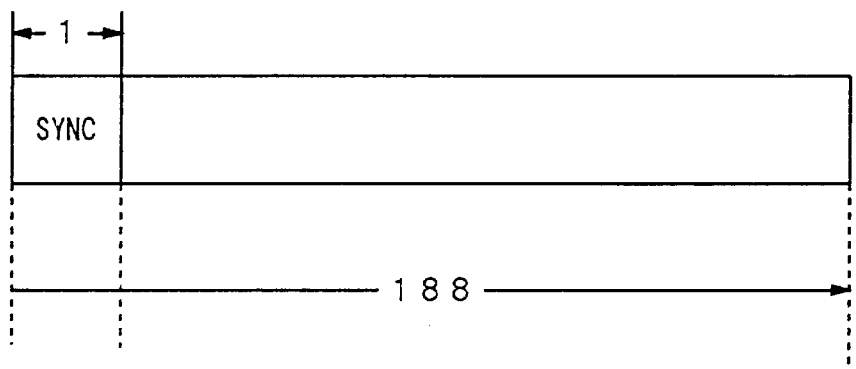
FIG. 9A illustrates the data structure of a received transport packet.
Figure 9B:
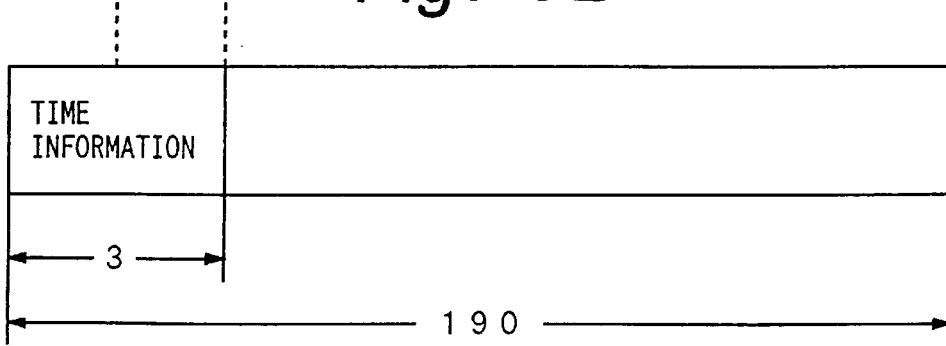
FIG. 9B illustrates the data structure of the transport packet having time information added thereto.

In accordance with this embodiment of the present invention, rate converting and format circuit 110 adds time information to a transport packet before the bit rate thereof is changed. Then, upon reproduction of the transport packet, the time information is recovered from the transport packet so as to allow proper reproduction thereof. FIG. 9A illustrates the data structure of a transport packet which is comprised of 188 bytes of data and whose first byte represents sync data. In accordance with the present invention, the sync byte is removed from the transport packet and 3 bytes of time data (time information) is inserted at the beginning of the remaining 187 bytes to produce a 190-byte transport packet, shown in FIG. 9B.

Figure 10:
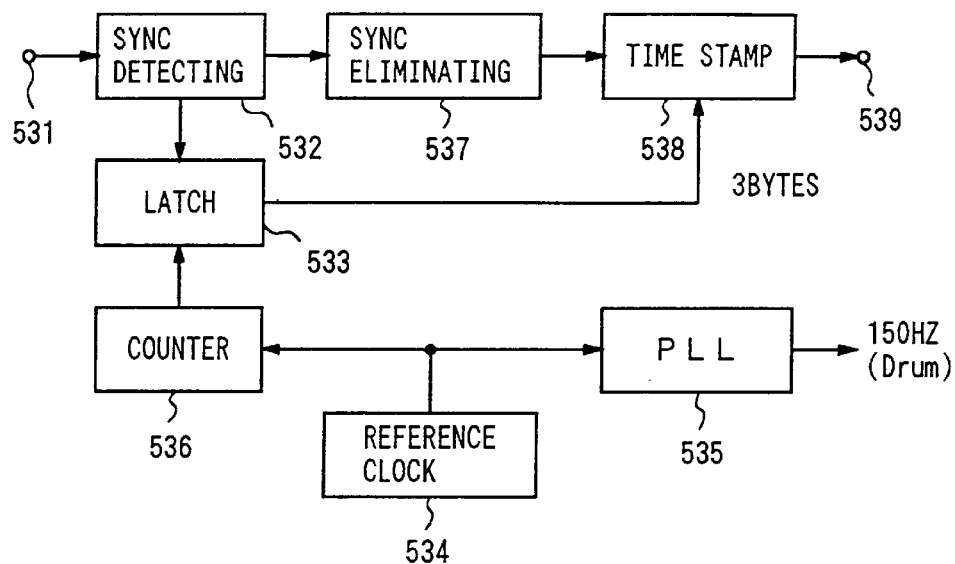
FIG. 10 is a block diagram of a circuit which adds time information to a transport packet in accordance with the present invention.

FIG. 10 is a block diagram of a circuit for carrying out the present invention. Prior to converting the bit rate of the transport packet which is supplied to input terminal 531 and to a sync detecting circuit 532, circuit 532 detects a sync byte at the beginning of the supplied transport packet and supplies a detection signal to a latch 533 upon detection of the sync byte. Sync detecting circuit 532 supplies the transport packet to a sync eliminating circuit 537 which removes the sync byte from the transport packet and the transport packet (without the sync byte) is supplied to a time stamp circuit 538.

A reference oscillating circuit 534 generates a 27 MHz reference signal and supplies the reference signal to a PLL circuit 535 and to a counter 536. PLL circuit 535 produces a 150 Hz signal at which the rotary drum rotates.

Counter 536 generates a 27 MHz system clock from the reference signal supplied thereto and supplies the system clock to latch 533 which latches the value of the system clock when sync detecting circuit 532 detects a sync byte in the transport packet. Latch 533 supplies the latched value to time stamp circuit 538 which adds the time value to the beginning of the supplied transport packet (to produce the transport packet shown in FIG. 9B) and outputs the transport packet at output terminal 539.

Figure 11:
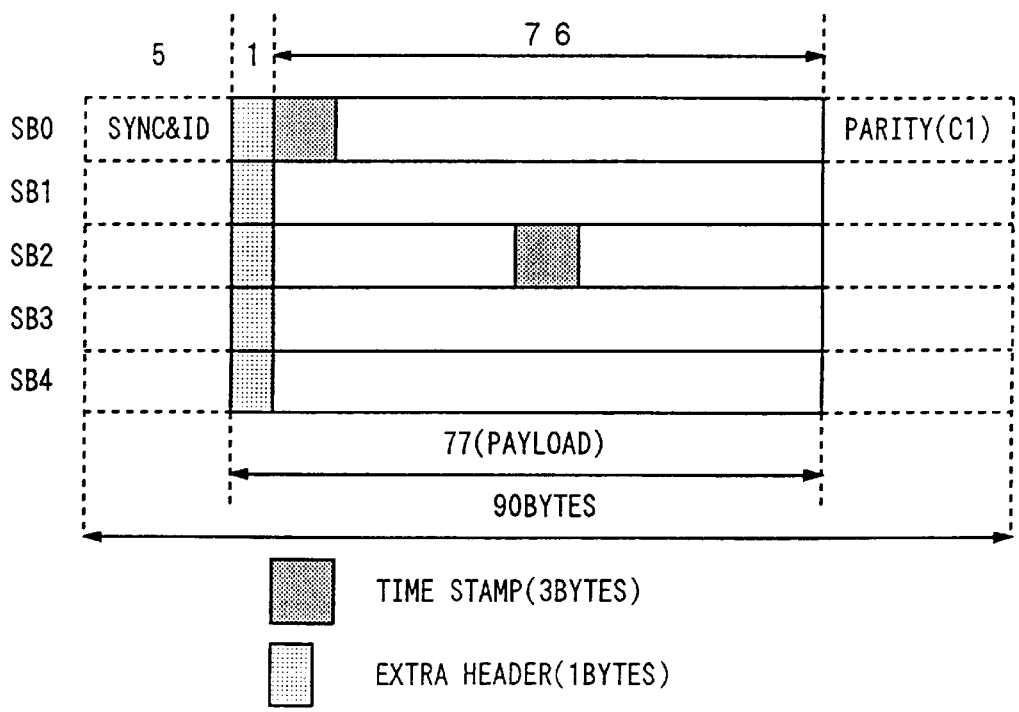
FIG. 11 illustrates the data structure of two transport packets which are combined to produce 5 sync blocks.

As previously stated, PLL circuit 535 controls the rotation of the rotary drum, and thus, the rotation of the drum is synchronized with the reference clock during both recording and reproduction of the digital data. A sync byte of a transport packet which is comprised of 188 bytes is replaced with a 3-byte time data to produce a transport packet of 190 bytes. FIG. 11 illustrates the data structure of two transport packets which are combined back-to-back and which combination is divided into five sync blocks. As shown, the two transport packets are combined and divided into five sync blocks, where each sync block includes 76 bytes of data. Then, an extra header of 1 byte and 5 bytes of sync and ID data are added to the beginning of each sync block and 8 bytes of parity data are added to the end of each sync block to produce 5 90-byte sync blocks.

Figure 12:
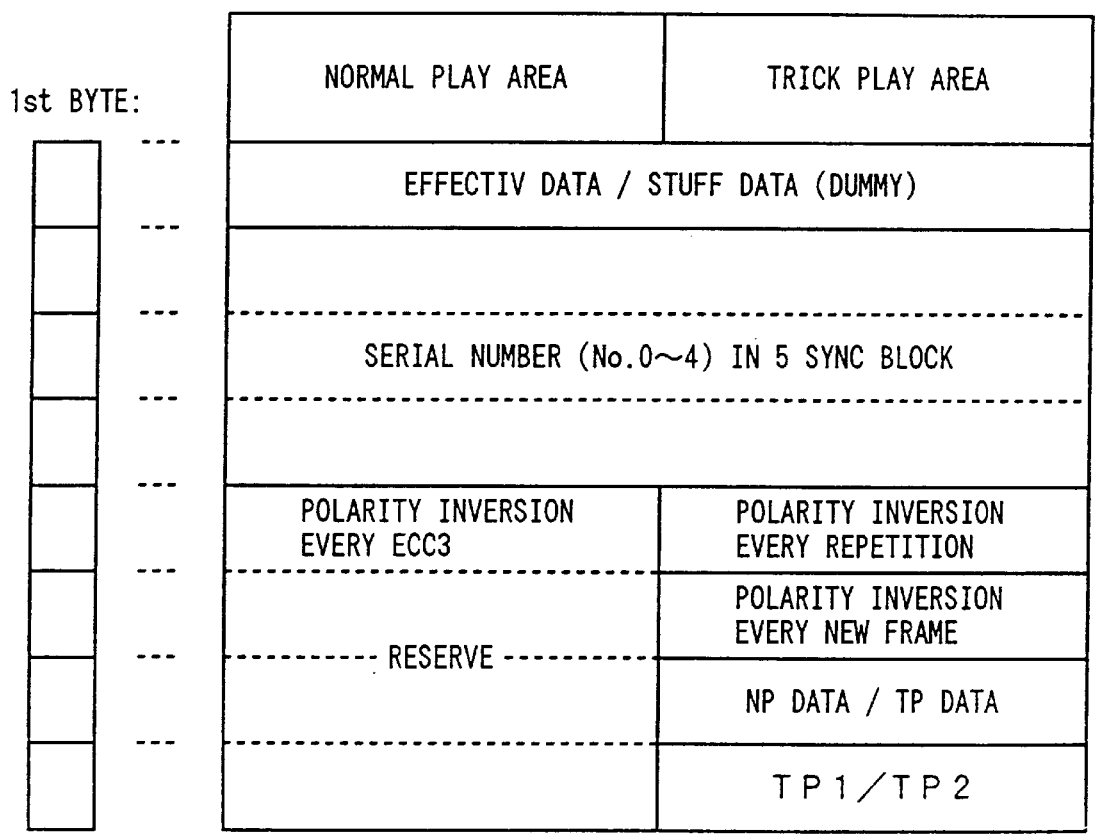
FIG. 12 illustrates the data structure of the extra header in each of the sync blocks shown in FIG. 11.

FIG. 12 illustrates the data structure of the extra header of each sync block. As shown, the header of a sync block recorded in a normal play area or recorded in a trick-play area of the track (to be discussed) is comprised of various information including the sync block serial number and polarity inversion data. Referring again to FIG. 11, each of the five sync blocks includes 76 bytes of transport packet data for a total of 380 bytes, and each transport packet is comprised of 190 bytes of data (see FIG. 9), so that two transport packets are provided in 5 sync blocks (2×190=380 bytes).

In accordance with another feature of the present invention, each track on a magnetic tape is divided into a normal play area and a "trick-play" area in which the trick-play area corresponds to that part of the track which is reproduced when a digital video tape recorder embodying the present invention is operating in a variable or high-speed reproducing mode. MPEG2 formatted video signals are comprised of I-frames, P-frames and B-frames as previously discussed; however, only data corresponding to the I-frames are recorded in the trick-play area of each track, as further discussed below.

In the above embodiments, a transport packet is recorded at a bit rate of 10 Mbps; but the digital video tape recorder is operable to record digital data at 25 Mbps in the SD recording mode. Since there is a surplus in the recorded digital signal, a transport packet, particularly a transport packet which includes I-frame data, is recorded in both the normal play area and the trick-play area of a track.

Figure 13:
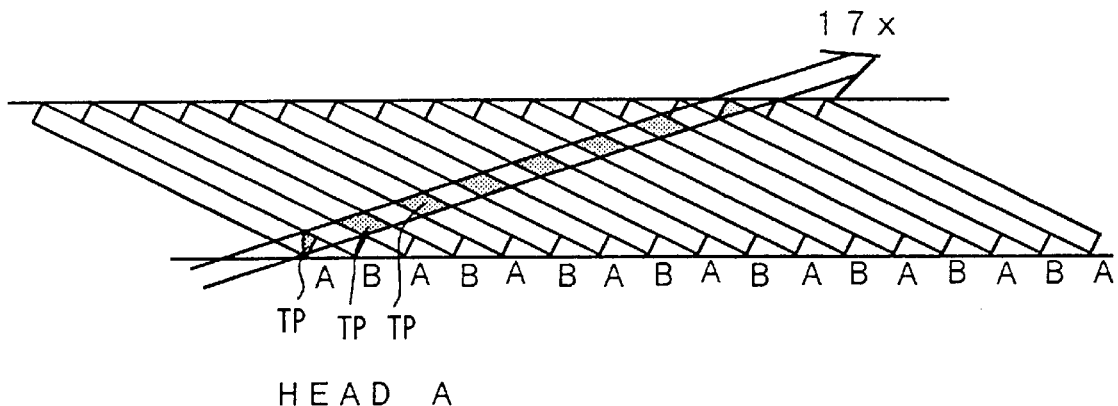
FIG. 13 is a schematic representation of the path of a reproducing head during a high-speed reproducing operation in accordance with the present invention.
Figure 14:
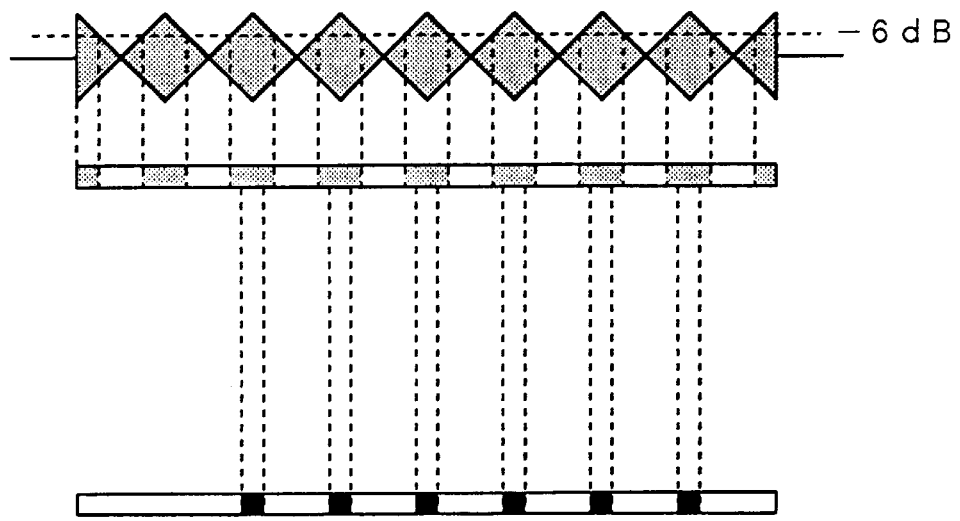
FIG. 14 is a schematic illustration of the reproduced signal in a high-speed reproducing mode.

FIG. 13 is a schematic representation of the path of a reproducing head during a 17× high-speed reproducing operation in accordance with the present invention. As shown, head A scans the tracks while the magnetic tape is transported at a substantially faster than normal speed (e.g., 17 times as fast as the normal speed). Since tracks generally are helically recorded by two heads which have different azimuths, head A reproduces scanned portions of alternating tracks. That is, head A reproduces those areas shown in FIG. 13 which are partially shaded, and as shown, the reproduced areas are located only on "A" tracks. The reproduced portions (i.e., the shaded portions), are designated as the trick-play (TP) area of a track. FIG. 14 illustrates that the signal reproduced from each A track is in the form of a burst, where the greatest part of the signal occurs when the head is at the center of each track. Then, ATF tracking to control the tape moving speed in a high-speed reproducing mode may easily be accomplished by locking the phase of the reproduced signal with the movement of the tape.

Figure 15:
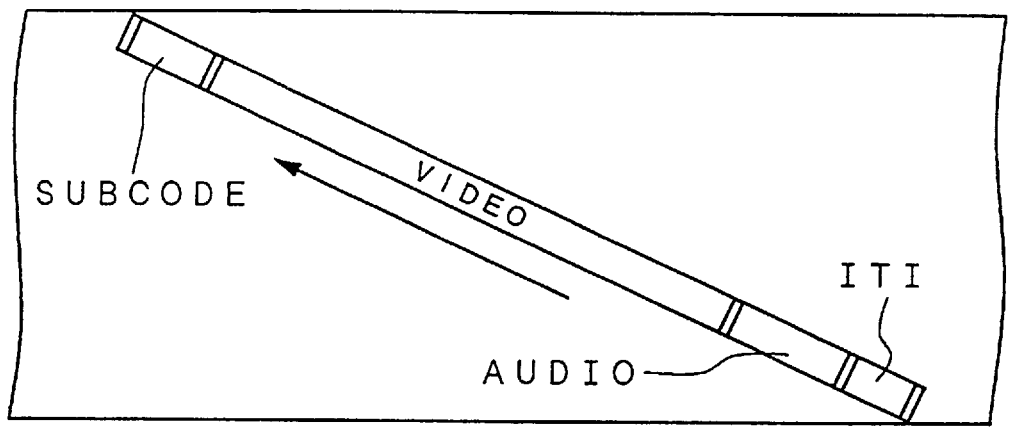
FIG. 15 illustrates the data structure of a track on a magnetic tape.

FIG. 15 illustrates an exemplary data structure of a track recorded on a magnetic tape by a digital video tape recorder embodying the present invention. As shown, a track is comprised of a subcode area, a video area, an audio area and an ITI area. The different areas of a track are well known, and therefore, are not described further herein, except where necessary to understand the present invention.

Figure 16:
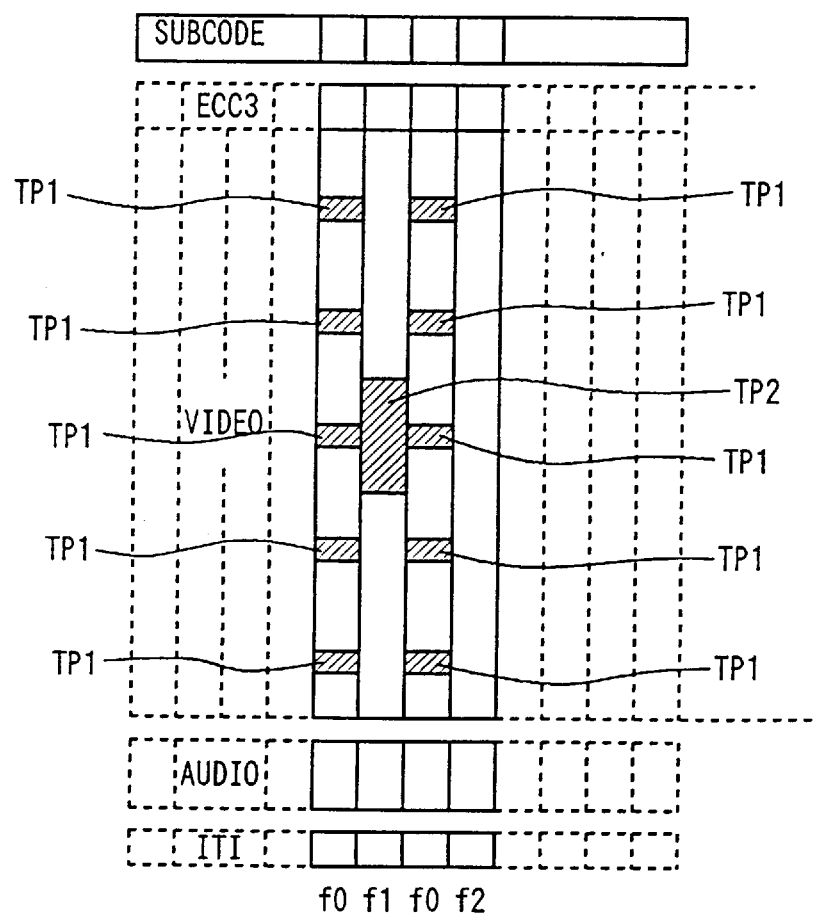
FIG. 16 illustrates approximate locations of the trick-play areas TP1 and TP2 in successive tracks on a magnetic tape.

In a preferred embodiment of the present invention, each track on a magnetic tape is provided with two sets of trick-play areas TP1 and TP2. Digital data stored in the first trick-play area TP1 is reproduced in a "high-variable"-speed reproducing mode and digital data stored in the second trick-play area TP2 is reproduced in a "low-variable"-speed reproducing mode. The high-variable-speed and the low-variable-speed reproducing modes constitute different fast speed reproducing modes in which the magnetic tape is transported at faster than normal speeds. For example, trick-play area TP1 is reproduced in an 18× high-speed reproducing mode (the "high-variable"-speed reproducing mode), and trick-play area TP2 is reproduced in a 4×speed reproducing mode (the "low-variable"-speed reproducing mode). FIG. 16 illustrates approximate locations of the trick-play areas TP1 and TP2 in successive tracks on a magnetic tape and, as shown, alternate tracks (i.e., "A" tracks) include only trick-play areas TP1, and the other alternating tracks (i.e., the "B" tracks) include only the trick-play areas TP2. To provide for an 18× reproducing mode, the same trick-play data is recorded in 18 trick-play areas of the same A track (not all trick-play areas TP1 are shown in FIG. 16). That is, since reproduction in high speed mode may begin at any tape position, any one of the reproducible areas (e.g., any TP area of an A track) may be produced; and therefore, each trick-play area TP1 of a track must contain the same trick-play data.

Similarly, each trick-play area TP2 of a B track includes the same trick-play data, and for a 4× speed reproducing mode, two trick-play areas TP2 are required in each B track.

Phase locking (i.e., automatic track following) is accomplished in digital video tape recorders by tracking a pilot signal F0 which is recorded in the ITI area of alternating tracks (e.g., A tracks). Tracks that do not contain pilot signal F0 (e.g., B tracks) are more likely to be affected by an "attaching" error of the reproducing heads. To minimize this problem, which especially occurs in high-speed reproducing modes, those tracks which are reproduced in the low-speed reproducing mode are assigned to those tracks which do not contain pilot signal F0. In other words, trick-play areas TP1, which are reproduced in the high-speed reproducing mode, are located in those tracks which to contain pilot signal F0. Since each trick-play area TP1 generally is substantially smaller than each trick-play area TP2, greater track deviation is permitted when trick-play area TP2 is reproduced.

FIG. 17 is a chart of the possible tape reproducing speeds of a digital video tape recorder embodying the present invention. As indicated, a digital video tape recorder whose drum has two heads disposed 1800 apart which rotate at 9,000 rpm (2*1head/9,000rpm) in a speed lock mode, or two adjacent heads which rotate at 9,000 rpm (1*2head/9, 000rpm) in the speed lock mode, or two pairs of adjacent heads which rotate at 4,500 rpm (2*2head/4,500rpm) in the speed lock mode can reproduce at speeds of ±1.5, 2.5, 3.5 ... 8.5 times the normal reproducing speed. At these speeds, trick-play data stored in trick-play areas TP1 of each track is reproduced. Furthermore, the digital video tape recorder can reproduce at speeds of 4, 18, −2 and −16 times the normal reproducing speed in a phase locked mode, wherein trick-play area TP1 is reproduced at the +18 and −16 (reverse) reproducing speeds and trick-play area TP2 is reproduced at the 4 and −2 times reproducing speeds.

Figure 18:
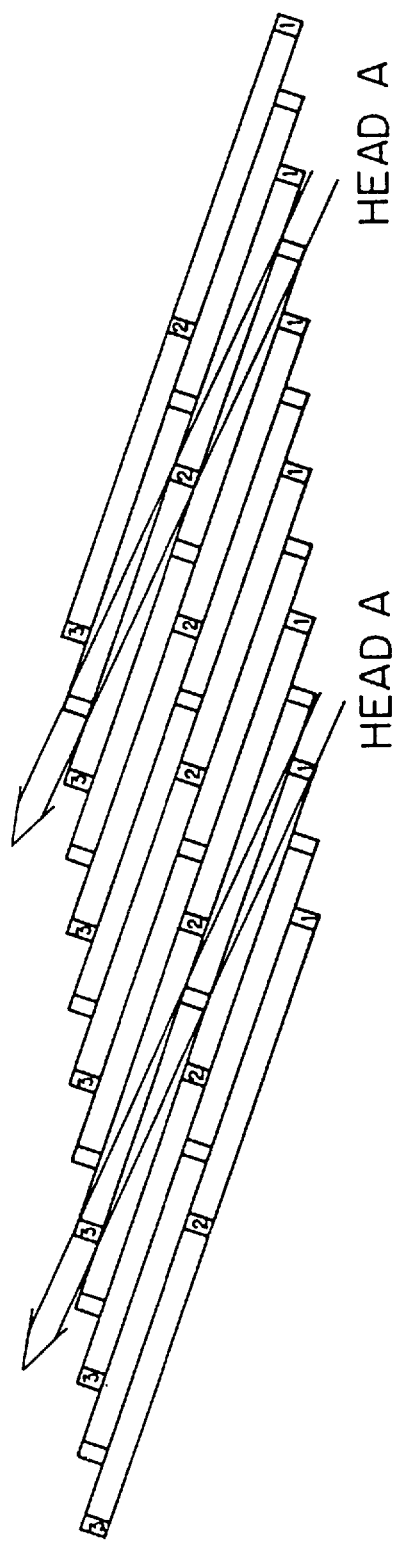
FIG. 18 is a schematic diagram of the path of a head A scanning tracks with an azimuth A in accordance with the present invention.

FIG. 18 illustrates the path of reproducing head A at one of the speeds 1.5 times, 2.5 times ... N+0.5 times the normal reproducing speed. As shown, all of the trick-play data stored on a track is reproduced in two scans by the same reproducing head A. Specifically, the maximum reproducing speed is set to 7 times normal speed in FIG. 18 but reproduction is performed at 3.5 times normal speed. Then, the trick-play areas located at the beginning (1) and end (3) of an A track are reproduced in one scan pass by head A and the trick-play area (2) located in the middle of an A area is reproduced in the second scan pass by head A. FIGS. 19A and 19B illustrate the portions of a track which are reproduced in the first and second scan passes, respectively.

FIGS. 20A and 20B illustrate the data structure of each of four adjacent tracks T0, T1, T2 and T3. As shown in FIG. 20A, 9 sync blocks are provided as error correction code ECC 3 in each of the four adjacent tracks, and 101 sync blocks are recorded in the normal play area of each of the four adjacent tracks. 25 sync blocks are provided in trick-play area TP1 of tracks T0 and T2, and 25 sync blocks are provided in trick-play area TP2 of track T1. No sync blocks are provided in the trick-play area (TP1 or TP2) of track T3. As previously discussed with reference to FIG. 11, two transports packets are combined to form five sync blocks. Therefore, the number of sync blocks to be recorded in each of the trick-play areas TP1 and TP2 is set to an integer multiple of 5 (e.g., 0, 5, 10 ... 25, 30, etc.) so as to produce a proper match of sync blocks in the trick-play areas. Referring now to FIG. 20B, tracks T0 and T2 include in their respective trick-play area TP1 sync block numbers 40-44, 62-66, 84-88, 106-110 and 128-132; and track T1 contains in its trick-play area TP2 sync block numbers 38–62. Sync numbers 147–155 are recorded in the ECC 3 area of each of the four tracks.

When reproducing trick-play area TP1 in the high-speed (e.g., 18×) reproducing mode, the reproducing head is located at positions which reproduce both the subcode sector and the ITI sector of a track; and therefore, the subcode data is reproduced in this high-speed reproducing mode. Furthermore, in the high-speed reproducing mode, the burst length is too short to provide an adequate tracking error signal to perform tracking control (ATF) of the track. However, ATF control is accomplished by reproducing the ITI sector. In the low-speed (e.g., 4×) reproducing mode, since the burst signal is long, ATF control is achieved by reproducing the data area. Therefore, trick-play area TP2 (which is reproduced in the low speed mode) is provided at a position on the track where only the subcode data can be read.

Figure 21:
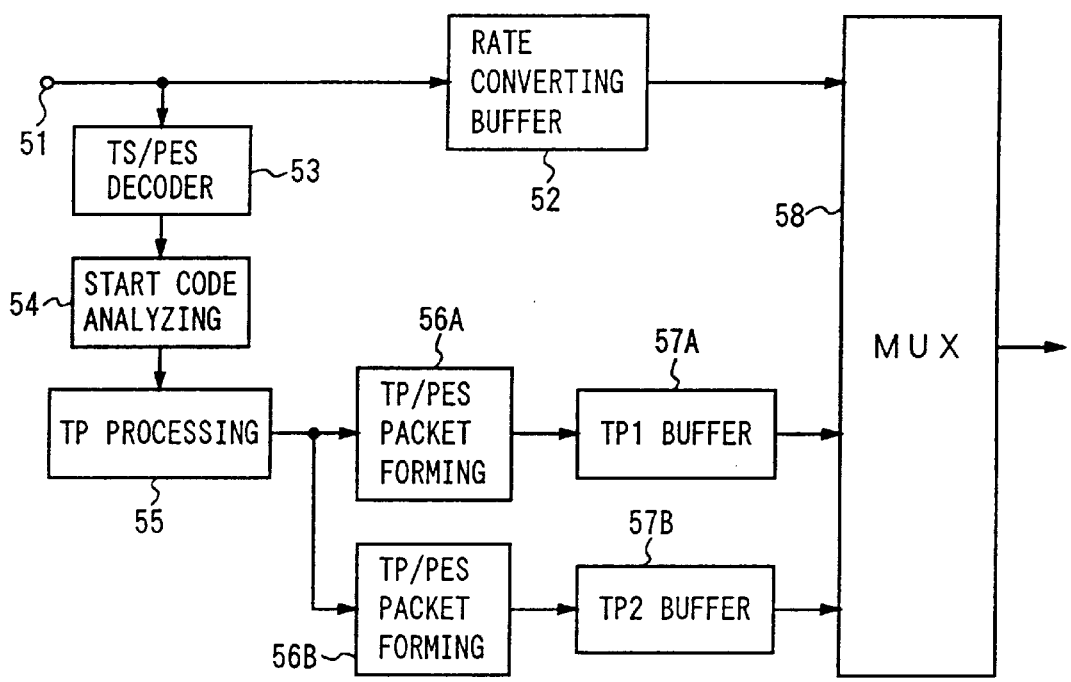
FIG. 21 is a block diagram of a circuit for implementing the recording of trick-play data in trick-play areas TP1 and TP2 in accordance with the present invention.

FIG. 21 is a block diagram of a circuit in a digital video tape recorder which operates to record transport packets of MPEG2-formatted video signals in trick-play areas of tracks on a magnetic tape. A transport packet which includes data of a selected program (i.e, the original signal may be a time divisionally multiplexed signal including a plurality of programs) and which is transmitted at a bit rate of 30 Mbps to input terminal 51 is supplied to a rate converting buffer 52 and to a TS/PES decoder 53. Rate converting buffer 52 converts the bit rate of the transmitted signal to 10 Mbps and supplies the rate converted signal to a multiplexer 58.

Decoder 53 decodes the transport packet and supplies the decoded transport packet to a start code analyzing circuit 54 which determines whether the transport packet includes video data that needs to be reproduced in high-speed reproducing modes. That is, circuit 54 identifies the priority of the transport packet and identifies whether the transport packet includes I-frame data from information in the header thereof, and if the transport packet includes data of an I-frame and of a high priority, that packet is supplied to a TP processing circuit 55. The transport packet is processed in various manners and is supplied to both TP/PES packet forming circuits 56A and 56B which form trick-play packet data for recording in trick-play areas TP1 and TP2, respectively. In other words, packet forming circuit 56A provides packets of data to be recorded in trick-play area TP1 (for high-speed reproduction), and packet forming circuit 56B provides packet data for trick-play area TP2 (for low-speed reproduction). The "high" and "low" trick-play packets are supplied to TP1 buffer 57A and TP2 buffer 57B, respectively, which store the supplied packets therein.

Buffers 52, 57A and 57B supply their respective stored contents to multiplexer 58 which multiplexes the three signals in a manner such that the transport packet (from buffer 52) is recorded in the normal play area of the track, the trick-play TP1 packet (from buffer 57A) is recorded in trick-play area TP1 of the track, and the trick-play TP2 packet (from buffer 57B) is recorded in trick-play area TP2 of the track. As previously discussed, trick-play areas TP1 and TP2 reside on different tracks.

Figure 22:
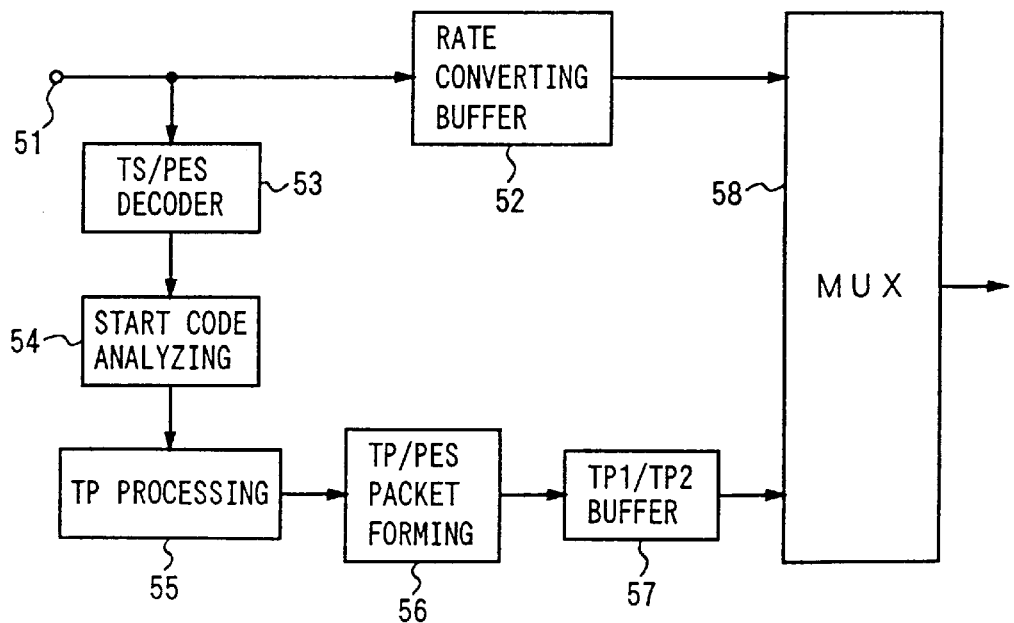
FIG. 22 is a block diagram of another circuit for implementing the recording of trick-play data in trick-play areas TP1 and TP2 in accordance with the present invention.

FIG. 22 is a block diagram of another circuit which records trick-play data in a trick-play area of a track, and is similar to the circuit of FIG. 21, except TP/PES packet forming circuit 56 and TP1/TP2 buffer 57 perform those functions that were carried out in circuits 56A and 56B, and 57A and 57B, respectively, of the circuit of FIG. 21. In the circuit of FIG. 22, dummy data is recorded at the end of each trick-play area TP1 since trick-play area TP2 contains more video data than each trick-play area TP1. Thus, the same number of sync blocks (e.g., 25 sync blocks) are recorded in each of the trick-play areas TP1 and TP2.

Figure 23:
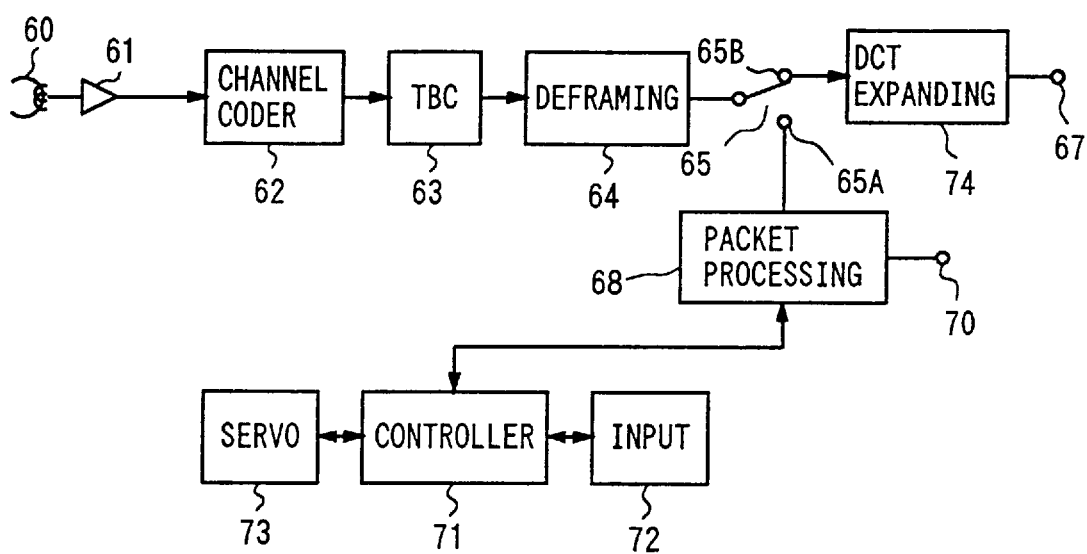
FIG. 23 is a block diagram of a digital video tape recorder which reproduces digital video data from a magnetic tape in accordance with the present invention.

FIG. 23 is a block diagram of a digital video tape recorder which reproduces transport packets in accordance with the present invention. A reproducing head 60 reproduces a transport packet from a magnetic tape and supplies via a reproducing amplifier 61 the reproduced signal to a channel coder 62 which demodulates the reproduced signal. A demodulated signal (i.e., a demodulated transport packet) is supplied to a time base corrector (TBC) 63 which removes a time base fluctuation component from the demodulated signal using a reference clock supplied thereto. The time base corrected signal is supplied to a deframing circuit 64 which deframes the video signal and performs error correction and the like and the deframed and error corrected video signal is supplied to a switch 65.

Similar to switch 104 shown in FIG. 7, switch 65 supplies the video signal from circuit 64 to output terminal 65A when the reproduced signal is an MPEG2-formatted signal, and supplies the video signal to an output terminal 65B for other formatted (e.g., NTSC) video signals. If the reproduced signal is, for example, an NTSC formatted video signal, switch 65 supplies the reproduced signal to a DCT expanding circuit 74 which performs the converse function of DCT compressing circuit 103 shown in FIG. 7 and the expanded video signal is supplied as an output at output terminal 67.

When an MPEG2 formatted video signal is reproduced, switch 65 supplies the MPEG2 signal to a packet processing circuit 68 which converts the bit rate of the transport packet from, for example, 10 Mbps to its original pre-time compressed bit rate. Processing circuit 68 further extracts the 3-byte time base information added to the packet (see FIG. 9) and sets the time base of the reproduced signal in accordance with the extracted time information.

In variable- or high-speed reproducing modes, input device 72 instructs a controller 71 to operate in the selected high-speed reproducing mode and to set a servo circuit 73, which controls the reproducing speed. Controller 71 controls packet processing circuit 68 to output only reproduced transport data (i.e., trick-play data) which corresponds to I-frames.

A digital video tape recorder in accordance with the present invention further is operable to record an MPEG2-formatted video signal which includes plural television programs when the total bit rate of all the programs combined is equal to or less than 25 Mbps. I-frames of program A are recorded in the trick-play areas and upon completion of the recording operation, I-frames of a program B are recorded in the trick-play areas, and finally, I-frames of a program C are recorded in the trick-play areas. Processing of the three programs is carried in a manner similar to the way they are multiplexed in the MPEG2 video signal. That is, program A is processed, program B is processed, program C is processed, program A is processed, and so on. In a high-speed reproducing mode, a selected program A is reproduced by ignoring trick-play data that corresponds to either program B or program C.

While the present invention has been particularly shown and described in conjunction with preferred embodiments thereof, it will be readily appreciated by those of ordinary skill in the art that various changes may be made without departing from the spirit and scope of the invention. For example, although MPEG2 signals have been described herein, the present invention is not limited to this format and may transmit, record and reproduce other types of video and/or audio signals.

As another example, although the present discussion is directed to rate converting transport packets between, for example, 10 Mbps and 30 Mbps, the present invention is not limited solely to the bit rates discussed herein, and may be widely applied to signals of other bit rates.

Therefore, it is intended that the appended claims be interpreted as including the embodiments described herein, the alternatives mentioned above, and all equivalents thereto.

What is claimed is:

1. A digital data recording apparatus, comprising:
   means for receiving a data packet which was time compressed at a predetermined compression ratio, said data packet containing time information which replaced original time information originally present in said data packet prior to time compression thereof, said time information having been generated by multiplying a reference clock by said predetermined compression ratio;

means for providing a portion of said data packet as variable-speed data; and recording means for recording said data packet and said variable-speed data in a normal and a trick-play area, respectively, on successive tracks on a record medium, said trick-play area being located on each of said tracks at a position corresponding to an area of a track which is reproducible in a fast-speed reproducing mode, said record medium being transportable in said fast-speed reproducing mode at a predetermined fast speed greater than a standard speed.

2. The apparatus of claim 1, wherein data packets are comprised of either intraframe coded data or interframe coded data and said recording means records in said trick-play area only a data packet which is comprised of intraframe coded data.

3. The apparatus of claim 1, wherein the respective trick-play areas of alternating tracks constitute first trick-play areas and the respective trick-play areas of remaining tracks constitute second trick-play areas; and said record means records said variable speed data in said first and second trick-play areas; wherein said first trick-play areas are located on said alternating tracks at a position corresponding to an area of a track which is reproducible in a first fast-speed reproducing mode, said second trick-play areas are located on the remaining tracks at a position corresponding to an area of a track which is reproducible in a second fast-speed reproducing mode, and said record medium is transportable in both said first and second fast-speed reproducing modes at respective predetermined fast speeds both different from one another and both greater than said standard speed.

4. The apparatus of claim 2, wherein said alternating tracks are recorded at a first azimuth angle, and the remaining tracks are recorded at a second azimuth angle different from said first azimuth angle.

5. The apparatus of claim 3, wherein said record medium is transported in said first fast-speed reproducing mode at a speed faster than in said second fast-speed reproducing mode; and automatic track following data is recorded in those tracks in which said first trick-play areas are located.

6. A digital data recording method, comprising the steps of:

receiving a data packet which was time compressed at a predetermined compression ratio, said data packet containing time information which replaced original time information originally present in said data packet prior to time compression thereof, said time information having been generated by multiplying a reference clock by said predetermined compression ratio;

providing a portion of said data packet as variable-speed data; and recording said data packet and said variable-speed data in a normal and a trick-play area, respectively, on successive tracks on a record medium, said trick-play area being located on each of said tracks at a position corresponding to an area of a track which is reproducible in a fast-speed reproducing mode, said record medium being transportable in said fast-speed reproducing mode at a predetermined fast speed greater than a standard speed.

7. The method of claim 6, wherein data packets are comprised of either intraframe coded data or interframe coded data and only a data packet which is comprised of intraframe coded data is recorded in said trick-play area.

8. The method of claim 6, wherein the respective trick-play areas of alternating tracks constitute first trick-play areas and the respective trick-play areas of remaining tracks constitute second trick-play areas; and said variable speed data is recorded in said first and second trick-play areas; wherein said first trick-play areas are located on said alternating tracks at a position corresponding to an area of a track which is reproducible in a first fast-speed reproducing mode, said second trick-play areas are located on the remaining tracks at a position corresponding to an area of a track which is reproducible in a second fast-speed reproducing mode, and said record medium is transportable in both said first and second fast-speed reproducing modes at respective predetermined fast speeds both different from one another and both greater than said standard speed.

9. The method of claim 8, wherein said alternating tracks are recorded at a first azimuth angle, and the remaining tracks are recorded at a second azimuth angle different from said first azimuth angle.

10. The method of claim 8, wherein said record medium is transported in said first fast-speed reproducing mode at a speed faster than in said second fast-speed reproducing mode; and automatic track following data is recorded in those tracks in which said first trick-play areas are located.

\* \* \* \* \*